(12) United States Patent
Lee et al.

(10) Patent No.: US 11,533,789 B2
(45) Date of Patent: Dec. 20, 2022

(54) INDUCTION HEATING APPARATUS HAVING IMPROVED INTERFERENCE NOISE CANCELLATION AND OUTPUT CONTROL FUNCTIONS

(71) Applicant: LG Electronics Inc., Seoul (KR)

(72) Inventors: Jae-Woo Lee, Seoul (KR); Byeong Wook Park, Seoul (KR); Dooyong Oh, Seoul (KR); Seungbok Ok, Seoul (KR)

(73) Assignee: LG Electronics Inc., Seoul (KR)

( * ) Notice: Subject to any disclaimer, the term of this patent is extended or adjusted under 35 U.S.C. 154(b) by 227 days.

(21) Appl. No.: 16/757,718

(22) PCT Filed: Nov. 28, 2018

(86) PCT No.: PCT/KR2018/014880
§ 371 (c)(1),
(2) Date: Apr. 20, 2020

(87) PCT Pub. No.: WO2019/135491
PCT Pub. Date: Jul. 11, 2019

(65) Prior Publication Data
US 2021/0204367 A1    Jul. 1, 2021

(30) Foreign Application Priority Data
Jan. 3, 2018 (KR) .......................... 10-2018-0000947

(51) Int. Cl.
*H05B 6/06* (2006.01)
*H05B 6/08* (2006.01)
*H02M 5/458* (2006.01)

(52) U.S. Cl.
CPC ............ *H05B 6/062* (2013.01); *H02M 5/458* (2013.01); *H05B 6/08* (2013.01)

(58) Field of Classification Search
CPC .... H02M 7/4815; H02M 1/327; H02M 5/458; H05B 6/062; H05B 6/08; Y02B 70/10
See application file for complete search history.

(56) References Cited

U.S. PATENT DOCUMENTS 3,953,783 A    4/1976  Peters
7,442,907 B2   10/2008 Miyauchi et al.
(Continued)

FOREIGN PATENT DOCUMENTS

CN    204518108    7/2015
EP     3461229     3/2019
(Continued)

OTHER PUBLICATIONS

Extended European Search Report in European Appln. No. 18897908.2, dated Jul. 30, 2021, 9 pages.

*Primary Examiner* — Dana Ross
*Assistant Examiner* — Kuangyue Chen
(74) *Attorney, Agent, or Firm* — Fish & Richardson P.C.

(57) ABSTRACT

An induction heating apparatus includes a working coil; an inverter configured to perform switching operation to thereby apply a resonance current to the working coil; and a controller configured to provide a control signal with a fixed frequency to the inverter to thereby control the switching operation. The controller changes a pulse width of the control signal based on a predetermined cycle that is set based on a temperature of the inverter.

19 Claims, 9 Drawing Sheets

(56) References Cited

U.S. PATENT DOCUMENTS

| | | | | |
|---|---|---|---|---|
| 2003/0164373 A1* | 9/2003 | Hirota | ............... | H05B 6/062 |
| | | | | 219/664 |
| 2007/0102420 A1* | 5/2007 | Miyauchi | ............... | H05B 6/062 |
| | | | | 219/661 |
| 2009/0014440 A1 | 1/2009 | Miyauchi et al. | | |
| 2010/0170893 A1 | 7/2010 | Breuninger et al. | | |
| 2011/0228564 A1* | 9/2011 | Uruno | ............... | H03K 17/168 |
| | | | | 327/109 |
| 2018/0183353 A1* | 6/2018 | Baek | ............... | H02M 1/08 |

FOREIGN PATENT DOCUMENTS

| | | |
|---|---|---|
| JP | 2006331964 | 12/2006 |
| KR | 19990029242 | 4/1999 |
| KR | 100714558 | 5/2007 |
| KR | 20080003733 | 9/2008 |
| KR | 20110009544 | 1/2011 |
| KR | 20170075913 | 7/2017 |

* cited by examiner

INDUCTION HEATING APPARATUS HAVING IMPROVED INTERFERENCE NOISE CANCELLATION AND OUTPUT CONTROL FUNCTIONS

CROSS-REFERENCE TO RELATED APPLICATIONS

This application is a National Stage application under 35 U.S.C. § 371 of International Application No. PCT/KR2018/014880, filed on Nov. 28, 2018, which claims the benefit of Korean Patent Application No. 10-2018-0000947, filed on Jan. 3, 2018. The disclosures of the prior applications are incorporated by reference in their entirety.

TECHNICAL FIELD

The present disclosure relates to an induction heating apparatus having improved interference noise cancelation and output control functions.

BACKGROUND

Various types of cooking apparatuses may be used to heat food in homes and restaurants. For example, gas stoves may use gas as fuel to heat food. In some cases, cooking devices may heat an object such as a cooking container including, for example, a pot, using electricity instead of gas.

Methods for heating an object using electricity may be classified as a resistance heating method and an induction heating method. In the resistance heating method, an object may be heated by heat that is generated when electric current flows through a metallic resistance wire, or through a non-metallic heating element such as silicon carbide, and the heat may be delivered to the object through radiation or conduction. In the induction heating method, an object (e.g., a cooking container) itself may be heated by eddy current that is generated in the object made of metallic ingredients, using a magnetic field generated around a coil when a predetermined magnitude of high-frequency power is supplied to the coil.

In some cases, an induction heating apparatus, when a plurality of containers are heated, may set driving frequencies based on an output to heat the containers. Due to a difference in driving frequencies of the containers, interference noise may be generated. In some cases, when the difference in driving frequencies of the containers is in a range of audible frequencies, users may experience unpleasant feelings.

FIG. 1 is a view illustrating an induction heating apparatus of the related art.

Referring to FIG. 1, amplitude modulation is used for the induction heating apparatus of the related art to prevent generation of high-frequency current in an audible frequency band, which is a cause for interference noise. That is, the induction heating apparatus of the related art performs an algorithm for canceling container noise based on information obtained from a laser Doppler vibrometer (LDV) that measures a magnetic field.

In some cases, the induction heating apparatus may be designed to minimize a difference in driving frequencies of each container to minimize interference noise that is generated when a plurality of containers are heated. In some cases, where the containers are driven at similar frequencies, a proper output may not be ensured. In some cases, turn on/turn off control may be performed to provide a low output. Due to the turn on/turn off control, continuous output operation may not be performed. In some cases, another type of noise may be generated between driving (i.e., an operation) and non-driving (i.e., a non operation).

In some cases, a method of setting a driving frequency of each container identically (i.e., use of a fixed frequency) may be used.

In some examples, where a fixed frequency is used, a pulse width (i.e., adjustment of duty; e.g., adjustment in a range of 10 to 50%) of a control signal (i.e., a control signal supplied to an inverter performing switching operation) may be adjusted to satisfy a wide range of outputs of the induction heating apparatus.

FIGS. 2 and 3 are graphs for illustrating an example of adjustment of duty in an induction heating apparatus of the related art.

Referring to FIG. 2, the upper graph illustrates waveforms of load voltage (VL; i.e., a voltage input to a switching element) and load current (IL; i.e., electric current flowing in a working coil) when duty (i.e., D1) is 50%, and the lower graph illustrates waveforms of switching element current (IS) when duty is 50%.

The graph illustrated in FIG. 2 may be a graph corresponding to the induction heating apparatus of the related art. For example, when duty (D1) of a gate signal supplied to the first switching element is 50%, duty (D2) of a gate signal supplied to the second switching element may also be 50%. When duty (D1) of a gate signal supplied to the first switching element is 30%, duty (D2) of a gate signal supplied to the second switching element may be 70%.

FIG. 2 illustrates the switching element current (IS) when the duty is 50% and a phase of load voltage (VL) leads a phase of load current (IL).

Referring to FIG. 3, the upper graph illustrates waveforms of load voltage (VL) and load current (IL) when duty (i.e., D1) is 30%, and the lower graph illustrates waveforms of switching element current (IS) when duty is 30%.

As illustrated in FIG. 3, when the duty is less than 35% (the number 35 is provided as an example and it may vary), a phase of load voltage (VL) lags behind a phase of load current (IL), loss may occur in the switching element current (IS), and heat of the switching element may be increased.

In some cases, when the duty is less than 35%, Zero Voltage Switching (ZVS) may not occur and loss may be caused by reverse recovery current in the switching element of the inverter. In some cases, discharge loss may occur in a snubber capacitor that reduces surge voltages, rush current and the like of the inverter. In these cases, heat of the switching element may be increased.

SUMMARY

The present disclosure describes an induction heating apparatus that can cancel or reduce interference noise generated when a plurality of containers are heated.

The present disclosure describes an induction heating apparatus that can implement continuous output operation in a wide range of outputs.

Aspects of the present disclosure are not limited to the above-described ones. Additionally, other aspects and advantages that have not been mentioned can be clearly understood from the following description and can be more clearly understood from embodiments. Further, it will be understood that the aspects and advantages of the present disclosure can be realized via means and combinations thereof that are described in the appended claims.

According to one aspect of the subject matter described in this application, an induction heating apparatus includes a working coil, an inverter configured to perform a switching operation to thereby supply a resonance current to the working coil, and a controller configured to provide a control signal having a fixed frequency to the inverter to thereby control the switching operation, and change a pulse width of the control signal based on a predetermined cycle that is set based on a temperature of the inverter.

Implementations according to this aspect may include one or more of the following features. For example, the induction heating apparatus may further include a plurality of snubber capacitors that are configured to be electrically connected to the inverter, and a relay that is controlled by the controller and that may be configured to connect the inverter to the plurality of snubber capacitors and to disconnect the inverter from the plurality of snubber capacitors.

In some examples, the inverter may include a first switching element configured to perform a first switching operation and a second switching element configured to perform a second switching operation, and the plurality of snubber capacitors may include a first snubber capacitor corresponding to the first switching element, and a second snubber capacitor corresponding to the second switching element. The controller may be configured to, based on a phase of current in the working coil leading a phase of a voltage supplied to one of the first switching element or the second switching element, control the relay to disconnect the inverter from the plurality of snubber capacitors.

In some implementations, the inverter may include a first switching element that may be configured to perform a first switching operation based on the control signal and a second switching element that may be configured to perform a second switching operation based on the control signal. The controller may be configured to provide the first switching element with a first control signal having a first pulse width, and provide the second switching element with a second control signal having a second pulse width, where the first pulse width and the second pulse width are complementary to each other.

In some examples, the controller may be configured to determine the first pulse width based on a first temperature of the first switching element and a second temperature of the second switching element, and at each of a plurality of instants of the predetermined cycle, change the pulse width of the control signal to match the first pulse width and provide the control signal to the first switching element. In some examples, the second switching element may be configured to, based on the first switching element being turned on by the first control signal, be turned off by the second control signal, and based on the first switching element being turned off by the first control signal, be turned on by the second control signal.

In some implementations, the induction heating apparatus may further include a resonance capacitor electrically connected to the working coil, a plurality of snubber capacitors that are configured to be electrically connected to the inverter, a relay configured to connect the inverter to the plurality of snubber capacitors and to disconnect the inverter from the plurality of snubber capacitors, a rectifier configured to convert alternating current (AC) power received from a power supply into direct current (DC) power and to supply the DC power to the inverter, and a DC link capacitor that is electrically connected to the rectifier and the inverter and that may be configured to reduce variation of the DC power converted by the rectifier.

In some examples, the inverter may include a first switching element configured to perform a first switching operation and a second switching element configured to perform a second switching operation, and the plurality of snubber capacitors may include a first snubber capacitor corresponding to the first switching element, and a second snubber capacitor corresponding to the second switching element. The DC link capacitor may have a first end configured to receive a voltage of the DC power and a second end connected to a ground.

In some implementations, the first end of the DC link capacitor is electrically connected to a first end of the first switching element and a first end of the first snubber capacitor. The relay has (i) a first end that is electrically connected to a second end of the first switching element and a first end of the second switching element, and (ii) a second end that is electrically connected to a second end of the first snubber capacitor, a first end of the second snubber capacitor, and the resonance capacitor. The second end of the DC link capacitor may be electrically connected to a second end of the second switching element, a second end of the second snubber capacitor, and the working coil. In some examples, the resonance capacitor may be electrically connected in series with the working coil, and the DC link capacitor may be electrically connected in parallel to the rectifier and to the inverter.

In some implementations, the induction heating apparatus may further include a semiconductor switch that is electrically connected to the working coil and that may be configured to turn on the working coil and turn off the working coil, where the controller may be configured to control operation of the semiconductor switch. In some implementations, the inverter may be a half bridge type inverter.

In some implementations, the controller may be configured to turn on the first switching element based on turning off the second switching element, the first pulse width corresponding to a period for which the second switching element is turned off, and turn on the second switching element based on turning off the first switching element, where the second pulse width corresponds to a period for which the first switching element is turned off. In some examples, the second pulse width may be equal to a first off-duration of the first control signal between two pulses of the first control signal, and the first pulse width may be equal to a second off-duration of the second control signal between two pulses of the second control signal.

In some implementations, the first end of the DC link capacitor may be electrically connected to a first end of the first switching element, a first end of the first snubber capacitor, and a first end of the working coil. The relay may have (i) a first end that is electrically connected to a second end of the first switching element and a first end of the second switching element, and (ii) a second end that is electrically connected to a second end of the first snubber capacitor, a first end of the second snubber capacitor, and the resonance capacitor. The second end of the DC link capacitor may be electrically connected to a second end of the second switching element and a second end of the second snubber capacitor.

In some implementations, the induction heating apparatus may further include a semiconductor switch that is electrically connected to the working coil and that may be configured to turn on the working coil and turn off the working coil, and the semiconductor switch may have a first end that is connected to the working coil and a second end that is connected to the second end of the second snubber capacitor and the second end of the second switching element.

In some implementations, the predetermined cycle may include a first on-duration for which the inverter is turned on, a first off-duration for which the inverter is turned off after the first on-duration, the first off-duration being greater than or equal to the first on-duration, a second on-duration for which the inverter is turned on after the first off-duration, the second on-duration being greater than or equal to the first on-duration, and a second off-duration for which the inverter is turned off after the second on-duration, the second off-duration being different from the first off-duration.

In some examples, the second on-duration is equal to the first off-duration. In some examples, a time point for switching from the first off-duration to the second on-duration is predetermined based on an increase of the temperature of the inverter during the switching operation.

In some implementations, the induction heating apparatus may adjust a pulse width under conditions of fixed frequencies without an additional device such as a LDV, and may cancel interference noise generated when a plurality of containers are heated, thereby cutting costs incurred for the additional device and ensuring improved user satisfaction and convenience through the cancelation of interference noise.

The induction heating apparatus may prevent a switching element from overheating, may implement a wide range of outputs without an additional circuit, and may implement continuous output operation in a wide range of outputs, thereby ensuring improved performance and credibility of products.

Detailed effects of the present disclosure are described together with the above-described effects in the detailed description of the disclosure.

DETAILED DESCRIPTION

Figure 1:
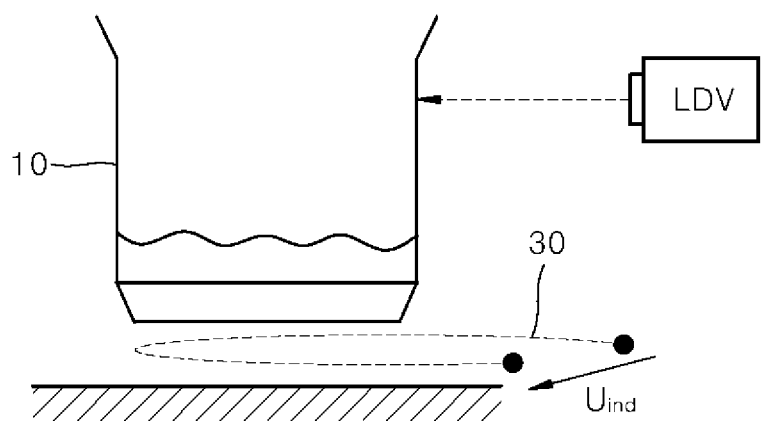
FIG. 1 is a view illustrating an induction heating apparatus in related art.

Below, one or more examples of the present disclosure are described with reference to the accompanying drawings. Throughout the drawings, like reference numerals denote like elements.

Figure 4:
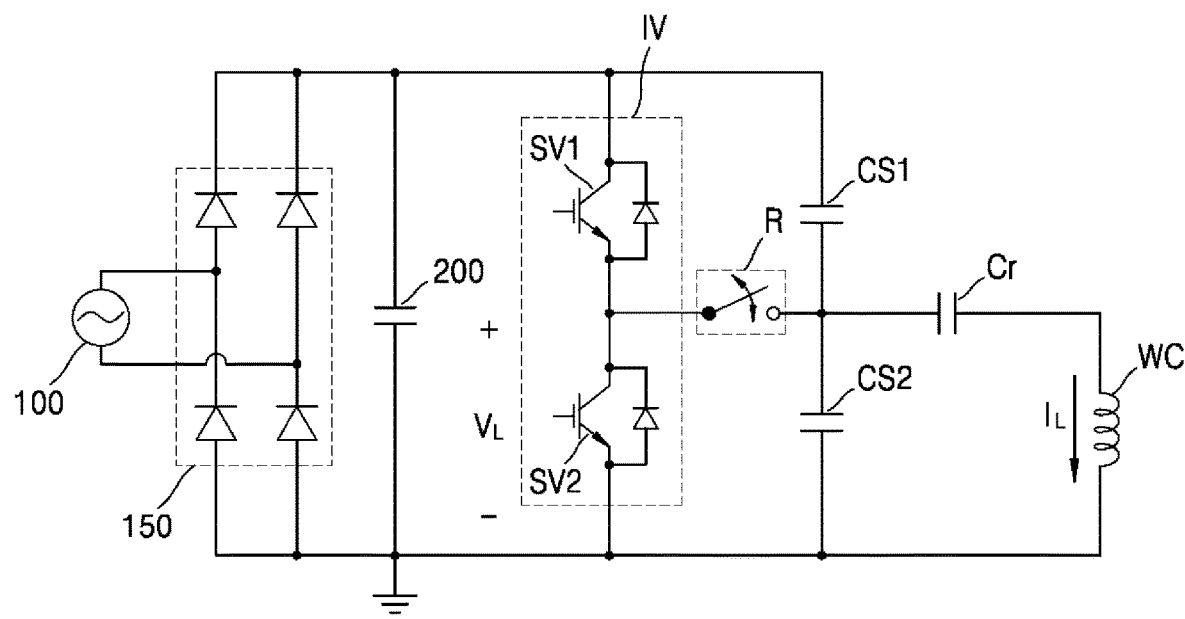
FIG. 4 is a circuit diagram illustrating an example of an induction heating apparatus.

FIG. 4 is a circuit diagram illustrating an example of an induction heating apparatus according to the present application.

Referring to FIG. 4, the induction heating apparatus 1 may include a power supply 100, a rectifier 150, a DC link capacitor 200, an inverter (IV), a plurality of snubber capacitors (CS1 and CS2), a resonance capacitor (Cr), a working coil (WC), and a relay (R).

In some implementations, the induction heating apparatus 1 may further include a controller and an input interface. For example, the controller may include an electric circuit, a microprocessor, a computer, a communication device, or the like.

The controller may control operation of various components (e.g., an inverter (IV), a relay (R) and the like) in the induction heating apparatus 1. The input interface, which is a module for inputting heating intensity desired by a user or a driving period of the induction heating apparatus, and the like, may be implemented in various different forms including the form of a physical button or a touch panel and the like, and may supply an input provided by a user to the controller.

For convenience of description, detailed description in relation to the input interface is omitted, and detailed description in relation to the controller is provided hereunder.

In some implementations, the number of the components (e.g., a plurality of inverters and working coils and the like) of the induction heating apparatus in FIG. 4 may vary. However, for convenience of description, suppose that the number of components of the induction heating apparatus 1 is the same as the number of components in FIG. 4.

The power supply 100 may output alternating current (AC) power.

The power supply 100 may output AC power and may supply the AC power to the rectifier 150. The power supply 100, for example, may be a commercial power supply.

The rectifier 150 may convert the AC power received from the power supply 100 into direct current (DC) power and may supply the DC power to the inverter (IV).

The rectifier 150 may rectify the AC power received from the power supply 100 and may convert the AC power into DC power.

The DC power rectified by the rectifier 150 may be supplied to the DC link capacitor 200 (i.e., a smoothing capacitor) electrically connected in parallel with the rectifier 150, and the DC link capacitor 200 may reduce ripple of the DC power.

The DC link capacitor 200 may be electrically connected in parallel with the rectifier 150 and the inverter (IV). One end of the DC link capacitor 200 may be supplied with a voltage corresponding to DC power (i.e., a DC voltage), and the other end of the DC link capacitor 200 may be ground.

In some implementations, DC power rectified by the rectifier 150 may be supplied to a filter, not to the DC link capacitor 200, and the filter may remove an AC component left in the DC power.

One example, where DC power rectified by the rectifier 150 is supplied to the DC link capacitor 200 in the induction heating apparatus 1, is described.

The inverter (IV) may be electrically connected to a resonance circuit (i.e., a circuit area at which the working coil (WC) and the resonance capacitor (Cr) are included), and may supply resonance current to the working coil (WC) through switching operation.

The inverter (IV), for example, may be formed into a half bridge and its switching operation may be controlled by the above-described controller. That is, the inverter (IV) may perform switching operation based on switching signals (i.e., control signals, also referred to as gate signals) received from the controller. For example, a half-bridge type inverter may include two switching elements and two capacitors, while a full-bridge type inverter may include four switching elements.

The inverter (IV) may include two switching elements (SV1 and SV2) that perform switching operation based on a control signal, and the two switching elements (SV1 and SV2) may be alternately turned on and turned off by control signals received from the controller. In some examples, the switching elements SV1 and SV2 may include a transistor, metal oxide semiconductor field effect transistor (MOSFET), insulated-gate bipolar transistor (IGBT), a diode, or the like.

For example, when a first switching element (SV1) is turned on by a control signal, a second switching element (SV2) is turned off by a control signal, and, when the first switching element (SV1) is turned off by a control signal, the second switching element (SV2) is turned on by a control signal.

High-frequency alternating current (i.e., resonance current) may be generated by switching operation of the two switching elements (SV1 and SV2), and the generated high-frequency alternating current may be supplied to the working coil (WC).

Control signals supplied to each switching element (SV1 and SV2) may be complementary. That is, a pulse width of a control signal supplied to the first switching element (SV1), and a pulse width of a control signal supplied to the second switching element (SV2) may be complementary.

For example, when a duty (i.e., a pulse width) of a control signal supplied to the first switching element (SV1) is 50%, duty of a control signal supplied to the second switching element (SV2) may also be 50%. When duty of a control signal supplied to the first switching element (SV1) is 30%, duty of a control signal supplied to the second switching element (SV2) may be 70%.

In some examples, the controller may be configured to turn on the first switching element based on turning off the second switching element, where the first pulse width corresponds to a period for which the second switching element is turned off. The controller may be configured to turn on the second switching element based on turning off the first switching element, the second pulse width corresponding to a period for which the first switching element is turned off.

In some implementations, a plurality of snubber capacitors (CS1 and CS2) and the DC link capacitor 200 may be electrically connected with the inverter (IV).

Specifically, one end of the first switching element (SV1) and one end of a first snubber capacitor (CS1) may be electrically connected to one end of the DC link capacitor 200, and the other end of the first switching element (SV1) and one end of the second switching element (SV2) may be electrically connected to one end of the relay (R). Additionally, the other end of the first snubber capacitor (CS1) and one end of a second snubber capacitor (CS2) may be electrically connected to the other end of the relay (R) together with the resonance capacitor (Cr). Further, the other end of the second switching element (SV2) and the other end of the second snubber capacitor (CS2) may be electrically connected to the other end of the DC link capacitor 200 together with the working coil (WC).

An electrical connection between the inverter (IV) and the plurality of snubber capacitors (CS1 and CS2) is selectively opened and closed through the relay (R). Detailed description in relation to this is provided below.

The plurality of snubber capacitors (CS1 and CS2) may be electrically connected to the inverter (IV).

The plurality of snubber capacitors (CS1 and CS2) may include a first snubber capacitor (CS1) corresponding to the first switching element (SV1), and a second snubber capacitor (CS2) corresponding to the second switching element (SV2).

The other end of the first snubber capacitor (CS1) and one end of the second snubber capacitor (CS2) may be electrically connected to the other end of the relay (R), and the other end of the first switching element (SV1) and one end of the second switching element (SV2) may be electrically connected to one end of the relay (R). Accordingly, the plurality of snubber capacitors (CS1 and CS2) may be electrically connected selectively to the inverter (IV) through the relay (R).

The plurality of snubber capacitors (CS1 and CS2) are provided to control and reduce rush current or transient voltages generated in the switching elements (SV1 and SV2) respectively corresponding to the plurality of snubber capacitors (CS1 and CS2). In some cases, the plurality of snubber capacitors (CS1 and CS2) may be used to cancel electromagnetic noise.

The working coil (WC) may receive resonance current form the inverter (IV).

Specifically, one end of the working coil (WC) is electrically connected to the resonance capacitor (Cr), and the other end of the working coil (WC) may be electrically connected to the other end of the DC link capacitor 200 (i.e. ground).

An object may be heated by eddy current that are generated between the working coil (WC) and the object (e.g., an object such as a cooking container) by high-frequency alternating current supplied from the inverter (IV) to the working coil (WC).

The resonance capacitor (Cr) may be electrically connected to the working coil (WC).

The resonance capacitor (Cr) may be electrically connected in series with the working coil (WC), and may constitute the resonance circuit together with the working coil (WC). That is, one end of the resonance capacitor (Cr) may be electrically connected to the relay (R), and the other end of the resonance capacitor (Cr) may be electrically connected to the working coil (WC).

The resonance capacitor (Cr) starts to resonate when a voltage is supplied by switching operation of the inverter (IV). When the resonance capacitor (Cr) resonates, electric current flowing in the working coil (WC) electrically connected with the resonance capacitor (Cr) increase.

Through the above-described process, eddy current are induced to an object placed on an upper portion of the working coil (WC) electrically connected to the resonance capacitor (Cr).

The relay (R) may selectively open and close an electrical connection between the inverter (IV) and the plurality of snubber capacitors (CS1 and CS2) and may be controlled by the above-described controller.

One end of the relay (R) may be electrically connected to the other end of the first switching element (SV1) and one end of the second switching element (SV2), and the other end of the relay (R) may be electrically connected to the other end of the first snubber capacitor (CS1) and one end of the second snubber capacitor (CS2).

Detailed description in relation to selective opening and closing operation of the relay (R) is provided below.

In some implementations, the induction heating apparatus 1 may perform the function of wireless power transmission based on the above-described configurations and features.

For example, a battery of an electronic device, using wireless power transmitting technology, may be charged by being placed on a charge pad without connecting to an additional charge connector. Accordingly, the electronic device, to which the wireless power transmitting technology is applied, may not need a cable or a charger, which may improve mobility and a reduced size and weight of the device.

The wireless power transmitting technology can be classified as an electromagnetic induction technology using a coil, and a resonance technology using resonance, a radio emission technology for converting electric energy into microwaves and delivering the microwaves, and the like. Among the technologies, the electromagnetic induction technology is a technology in which power is transmitted using electromagnetic induction between a primary coil (e.g., the working coil (WC)) provided at an apparatus for wirelessly transmitting power and a secondary coil provided at an apparatus for wirelessly receiving power.

The theory of the induction heating technology of the induction heating apparatus 1 is substantially the same as that of the wireless power transmitting technology using electromagnetic induction, in that an object is heated through electromagnetic induction.

Accordingly, the induction heating apparatus 1 may perform the function of wireless power transmission as well as the function of induction heating. Additionally, induction heating mode and wireless power transmitting mode may be controlled by the controller. Thus, when necessary, the function of induction heating or the function of wireless power transmission may be selectively performed.

Figure 5:
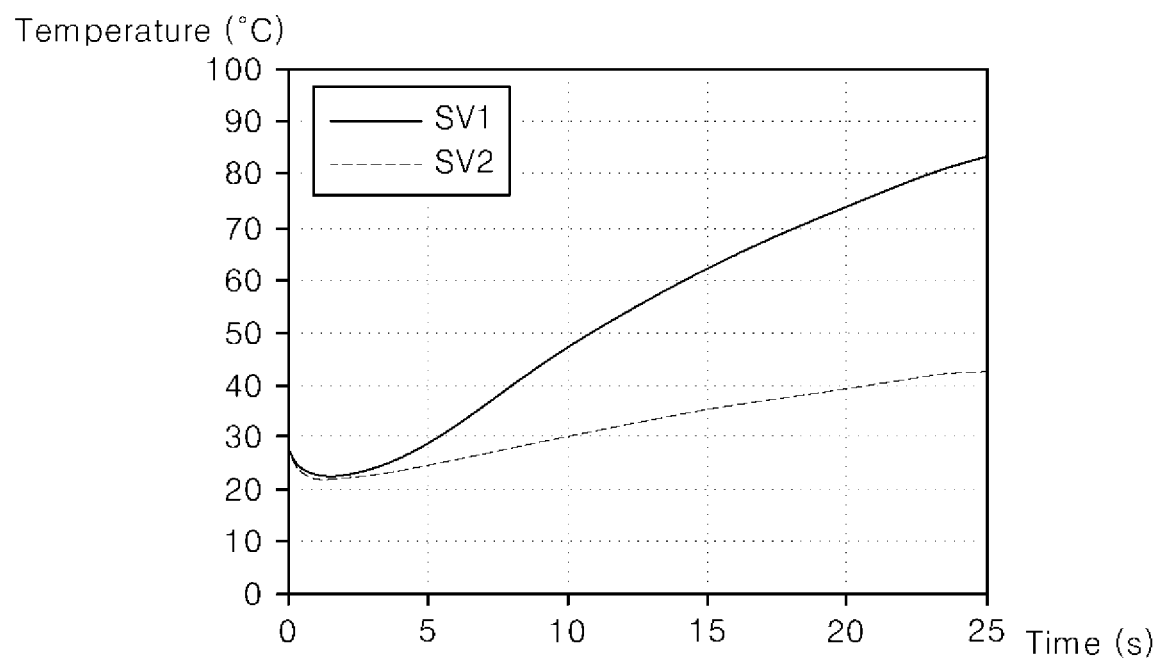
FIG. 5 is a view illustrating an example of a change in temperatures of an inverter in FIG. 4.
Figure 7:
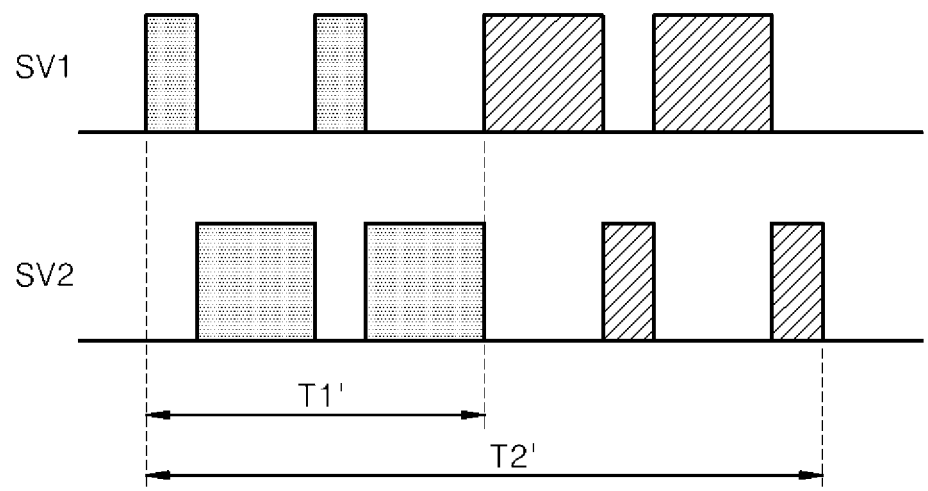

An output control method of the induction heating apparatus 1 with the above-described configurations and features is described hereunder with reference to FIGS. 5 and 7.

Figure 6:
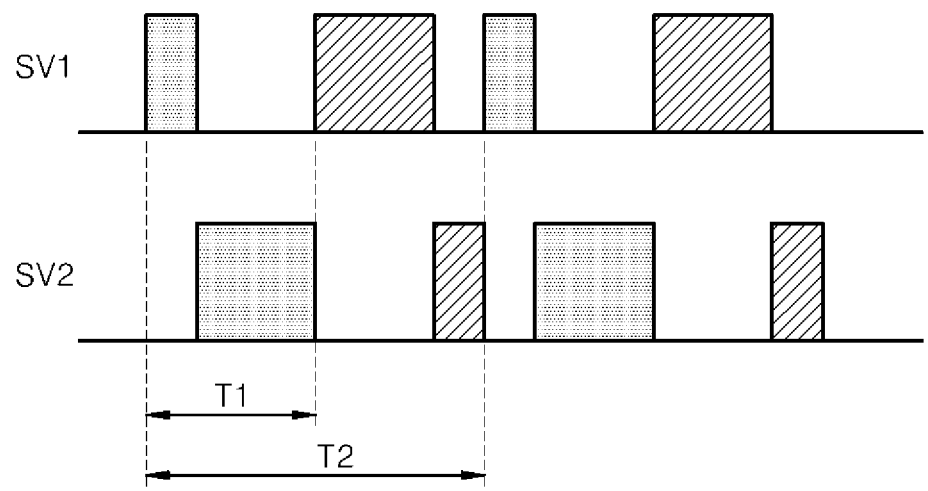
FIGS. 6 and 7 are views illustrating an example method of changing pulse widths of a control signal supplied to the inverter in FIG. 4.

FIG. 5 is a view illustrating an example of a change in temperatures of the inverter in FIG. 4. FIGS. 6 and 7 are views illustrating example methods of changing pulse widths of control signals supplied to the inverter in FIG. 4.

Referring to FIGS. 4 and 5, the controller may supply control signals having a fixed frequency to the inverter (IV) to control the switching operation of the inverter (IV). Accordingly, interference noise that is generated when a plurality of containers are heated may be suppressed.

Additionally, the induction heating apparatus 1 may generate a high output at the fixed frequency. However, a pulse width (i.e., duty) of a control signal supplied to the inverter (IV) (i.e., a signal supplied by the controller) has to be adjusted (e.g., in a range of 10 to 50%) such that an output is lowered while the fixed frequency is maintained.

Figure 2:
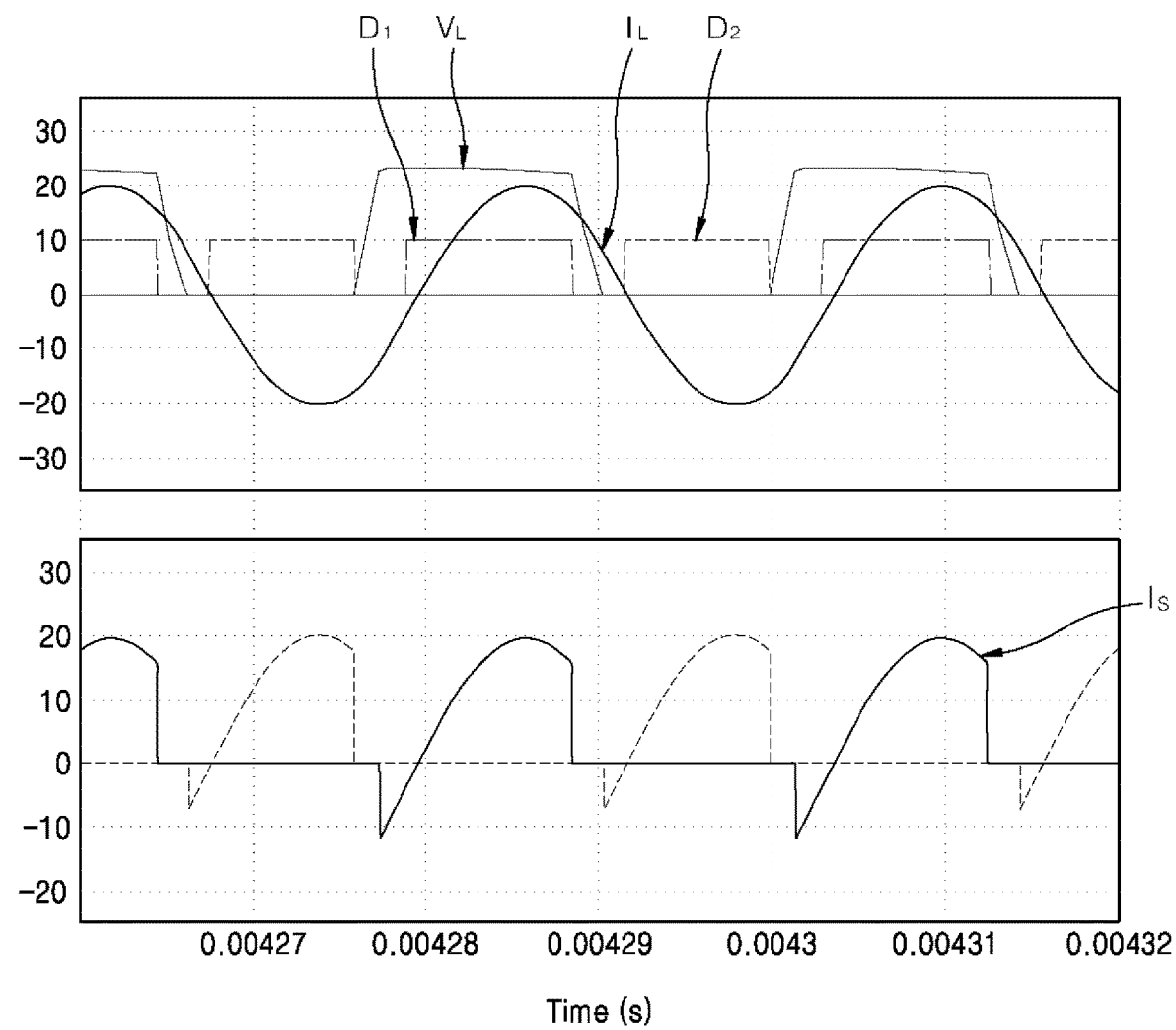
FIGS. 2 and 3 are graphs examples of adjustment of duty in an induction heating apparatus in related art.
Figure 3:
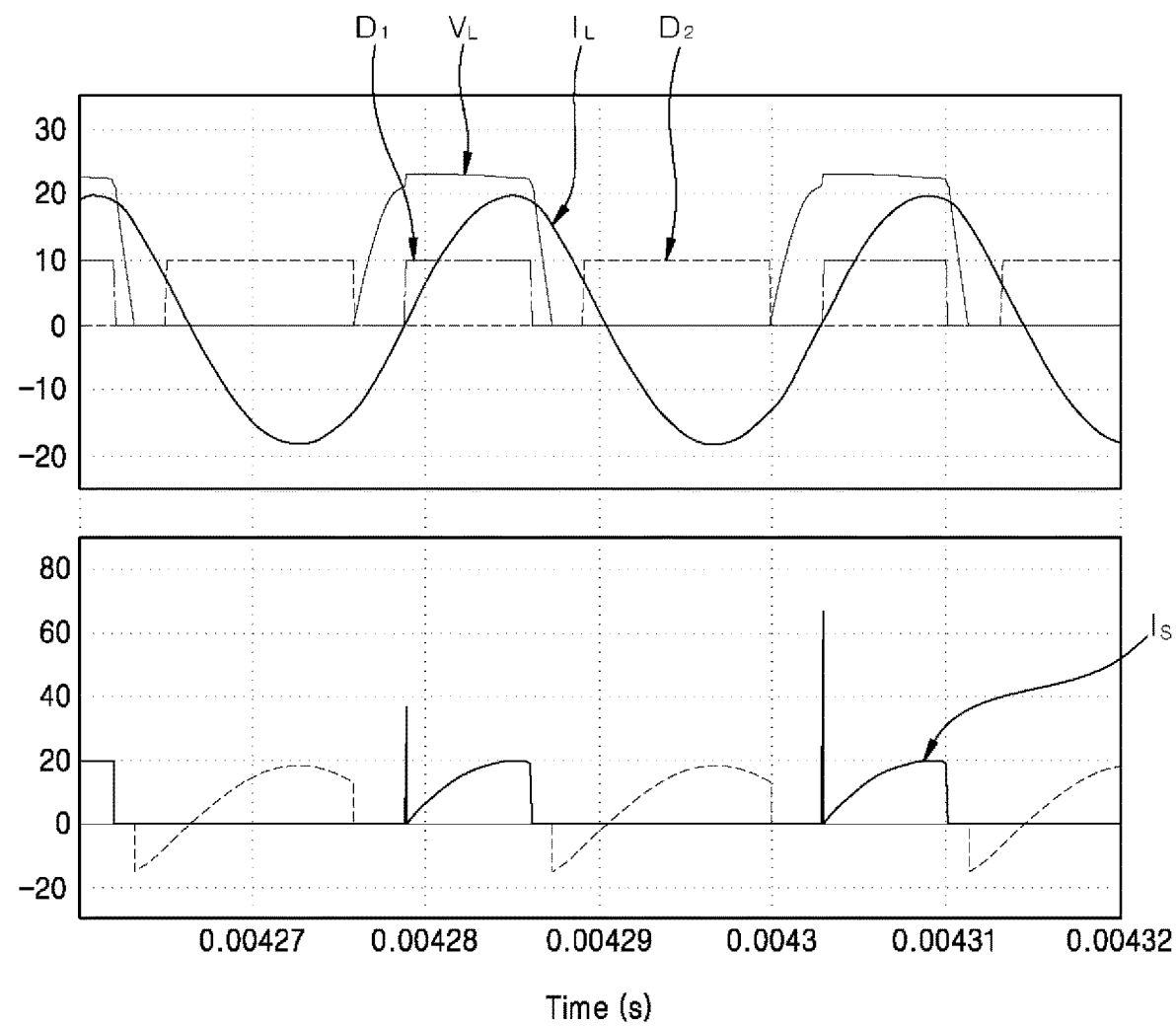

As described above with reference to FIGS. 2 and 3, when duty ranges from 35% to 50%, there is no problem. However, when duty is less than 35% (Herein, the duty value is provided as an example but not limited), a phase of load voltage (VL) lags behind a phase of load current (IL), resulting in a loss of switching element current (i.e., electric current flowing in the switching element). As a result, heat of the switching element (e.g., SV1 or SV2) may be increased.

For example, as illustrated in FIG. 5, when duty of a control signal supplied to the first switching element (SV1) is less than 35% (e.g., 30%), zero voltage switching (ZVS) may not occur and loss is caused by reverse recovery current, in the first switching element (SV1), and discharge loss occurs in the first snubber capacitor (CS1). Accordingly, heat of the first switching element (SV1) is greater than heat of the second switching element (SV2).

In some implementations, output in the induction heating apparatus 1 may be controlled as follows.

As a control signal supplied to the first switching element (SV1) and a control signal supplied to the second switching element (SV1) have a complementary relation, the first switching element (SV1) is described as an example.

For example, when duty of a control signal supplied to the first switching element (SV1) is adjusted between 35% to 50% in a state in which the relay (R) connects between the inverter (IV) and the plurality of snubber capacitors (CS1 and CS2), ZVS is possible, and a normal state in which heat generation may not concentrate on the first switching element (SV1) may be maintained.

In some implementations, when the controller reduces duty of a control signal supplied to the first switching element (SV1) to lower an output while maintaining a fixed frequency, ZVS is impossible at a specific time point (e.g., when duty is less than 35%), and discharge loss of the snubber capacitor (e.g., the first snubber capacitor (CS1)) may occur. Accordingly, heat generation may concentrate on the first switching element (SV1).

In some implementations, the controller may separate the inverter (IV) and the plurality of snubber capacitors (CS1 and CS2) by opening the relay (R). By doing so, discharge loss of the snubber capacitor (i.e., discharge loss of a snubber capacitor, which occurs when a switching element is turned on in a state in which the snubber capacitor is not discharged) may be removed.

When duty of a control signal supplied to the first switching element (SV1) is adjusted between 35% to 50% in a state in which the relay (R) connects between the inverter (IV) and the plurality of snubber capacitors (CS1 and CS2), a phase of a voltage (VL) supplied to the first switching element (SV1) may lead a phase of an electric current (IL) flowing in the working coil (WC).

However, when the controller reduces duty of a control signal supplied to the first switching element (SV1) to lower an output while maintaining a fixed frequency, a phase of an electric current (IL) flowing in the working coil (WC) may lead a phase of a voltage (VL) supplied to the first switching element (SV1) at a specific time point (e.g., when duty is less than 35%), and loss may occur due to reverse recovery current. Accordingly, heat generation may concentrate on the first switching element (SV1).

In this situation, the controller may detect a temperature of the inverter (IV), and, based on the detected temperature, may change a pulse width (i.e., duty) of the control signal at every predetermined cycle.

The temperature of the inverter (IV) may be detected by an additional device (e.g., a temperature detection sensor) not by the controller, and detected temperature information is supplied to the controller. For convenience of description, one example, where the controller detects a temperature of the inverter (IV), is described.

Specifically, the controller may determine a pulse width of a control signal supplied to the first switching element (SV1) based on temperatures of the first and second switching elements (SV1 and SV2), and may change a pulse width of a control signal to the determined pulse width at every predetermined cycle and supply the changed pulse width to the first switching element (SV1).

Referring to FIG. 6, the controller may change duty of a control signal supplied to the first switching element (SV1) at every predetermined cycle (T1).

For example, the controller may set an offset (e.g., 20%) with respect to duty of 50%, and may alternately supply a control signal having a pulse width corresponding to duty−offset (e.g., 30%) and a control signal having a pulse width corresponding to duty+offset (e.g., 70%) to the first switching element (SV1) at every predetermined cycle (T1). By doing so, the control signal having a pulse width corresponding to duty−offset may be supplied to the first switching signal (SV1) at every alternate cycle (T2), and the control signal having a pulse width corresponding to duty+offset may also be supplied to the second switching element (SV2) at every alternate cycle (T2).

That is, as heat generation concentrates on a switching element that receives a control signal having a small duty among the two switching elements (SV1 and SV2), the controller may alternately supply the control signal of a small duty to the first switching element (SV1) and the second switching element (SV2) at every predetermined cycle such that the switching element on which heat generation concentrates is continuously switched. By doing so, heat generation may be prevented from concentrating on a single switching element and the switching element may be prevented from overheating.

In some implementations, during a period corresponding to the alternate cycle (T2), a period of maintaining the turn-on of duty supplied to the first switching element (SV1) and a period of maintaining the turn-on of duty supplied to the second switching element (SV2) may not be the same.

For example, during a period corresponding to the alternate cycle (T2), a period of maintaining the turn-on of duty supplied to the first switching element (SV1) may be 30%+60%=a total of 90%, and a period of maintaining the turn-on of duty supplied to the second switching element (SV2) may be 70%+40%=a total of 110%.

That is, a period of maintaining the turn-on of duty supplied to the first switching element (SV1), and a period of maintaining the turn-on of duty supplied to the second switching element (SV2) may be set differently, as the controller may control duty of a control signal based on an entire situation (e.g., the first and second switching elements (SV1 and SV2)'s temperatures and dead time (a period between a time point at which duty supplied to the first switching element (SV1) is turned off and a time point at which duty supplied to the second switching element (SV2) is turned on; a period during which duty supplied to the first switching element (SV1) and duty supplied to the second switching element (SV2) are all turned off; due to the dead time, there may be a difference between duty set by the controller and actual duty) and the like).

Referring to FIG. 7, the controller may change duty of a control signal supplied to the first switching element (SV1) at every predetermined cycle (T1').

FIG. 7 illustrates that the controller may supply a control signal having the same duty to the first switching element (SV1) during the predetermined cycle (T1') twice.

For example, the controller may supply a control signal having a pulse width corresponding to duty−offset (e.g. 30%) to the first switching element (SV1) twice during the predetermined cycle (T1') and then may supply a control signal having a pulse width corresponding to duty+offset (e.g., 70%) to the first switching element (SV1) twice during the following predetermined cycle (the following cycle of T1').

Thus, a control signal having a pulse width corresponding to duty−offset and a control signal having a pulse width corresponding to duty+offset may be respectively supplied to the first switching element (SV1) twice during a single alternate cycle (T2).

As described above, the controller may change a pulse width of a control signal based on an entire situation of the induction heating apparatus 1 in various ways. In some examples, the controller may also change a pulse width of a control signal using a method different from those in FIGS. 6 and 7.

Referring to FIG. 7, in some implementations, the predetermined cycle may include a first on-duration for which the inverter (e.g., the first switching element SV1 of the inverter IV) is turned on, a first off-duration for which the inverter is turned off after the first on-duration, in which the first off-duration may be greater than or equal to the first on-duration, a second on-duration for which the inverter is turned on after the first off-duration, in which the second on-duration may be greater than or equal to the first on-duration, and a second off-duration for which the inverter is turned off after the second on-duration, in which the second off-duration may be different from the first off-duration.

Thus, the induction heating apparatus 1 may adjust a pulse width of a control signal such that heat generation does not concentrate only on any one of the first and second switching elements (SV1 and SV2), thereby producing a lower output than an induction heating apparatus of the related art without overheating the switching element (i.e., a temperature of the inverter (IV) is maintained in a range of preset management temperatures (e.g., 120° C.)). Further, the induction heating apparatus 1 may not turn on/turn off the switching element to control the switching element, thereby making it possible to implement continuous output operation in a wider range of outputs than an induction heating apparatus of the related art.

The induction heating apparatus 1, as described above, may adjust a pulse width under conditions of a fixed frequency without an additional device such as a light duty vehicle (LDV), and may cancel interference noise that is generated when a plurality of containers are heated, thereby cutting costs incurred for the additional device and ensuring improved user satisfaction and convenience through the cancelation of interference noise.

Further, the induction heating apparatus 1 may prevent the switching element (e.g., SV1 or SV2) from overheating, may implement a wide range of outputs without an additional circuit, and may implement continuous output operation in a wide range of outputs, thereby ensuring improved performance and credibility of products.

Figure 8:
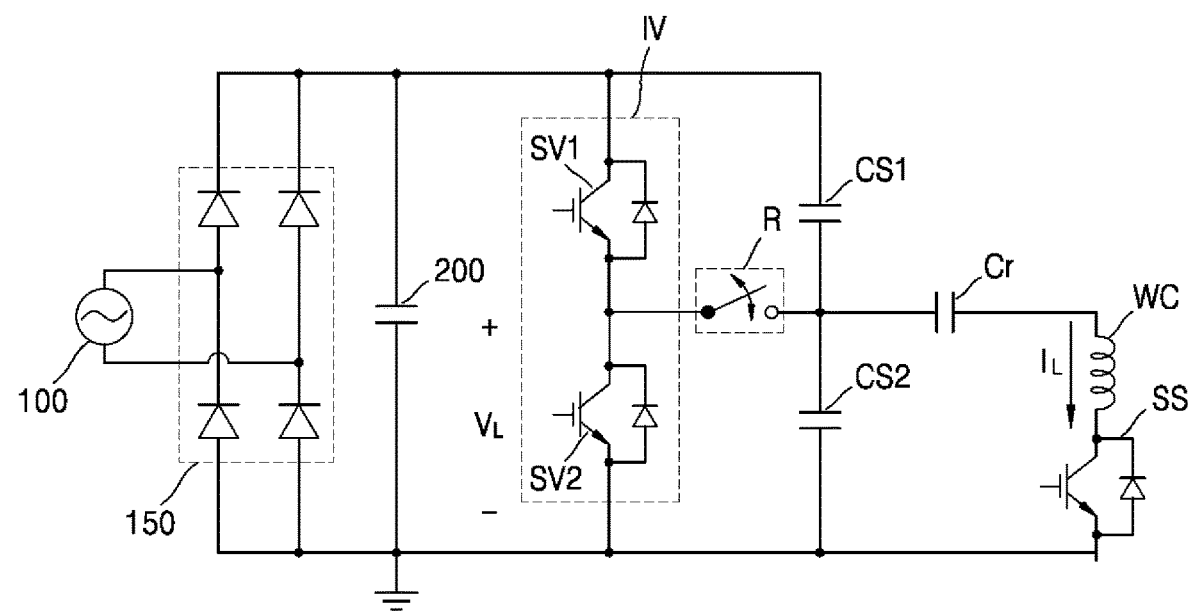
FIG. 8 is a circuit diagram illustrating the induction heating apparatus in FIG. 4 implemented as a zone free-type induction heating apparatus.

FIG. 8 is a circuit diagram illustrating the induction heating apparatus in FIG. 4 implemented as a zone free-type induction heating apparatus.

As illustrated in FIG. 8, a semiconductor switch (SS) is electrically connected additionally to the induction heating apparatus 1 in FIG. 4, to turn on/turn off the working coil (WC) at high speed. When a plurality of the working coils (WC) and the semiconductor switches (SS) are provided, a zone free-type induction heating apparatus may be implemented.

In some examples, the first end of the DC link capacitor 200 may be electrically connected to a first end of the first switching element SV1 and a first end of the first snubber capacitor CS1. The relay may have (i) a first end that is electrically connected to a second end of the first switching element SV1 and a first end of the second switching element SV2, and (ii) a second end that is electrically connected to a second end of the first snubber capacitor CS1, a first end of the second snubber capacitor CS2, and the resonance capacitor Cr. The second end of the DC link capacitor 200 may be electrically connected to a second end of the second switching element SV2, a second end of the second snubber capacitor CS2, the working coil WC, and a ground. The semiconductor switch SS may have a first end that is connected to the working coil WC and a second end that is connected to the second end of the second snubber capacitor CS2 and the second end of the second switching element SV2.

Even in the zone free-type induction heating apparatus, the above-described problems may be solved through the control method of the controller.

Below, an induction heating apparatus is described with reference to FIG. 9.

Figure 9:
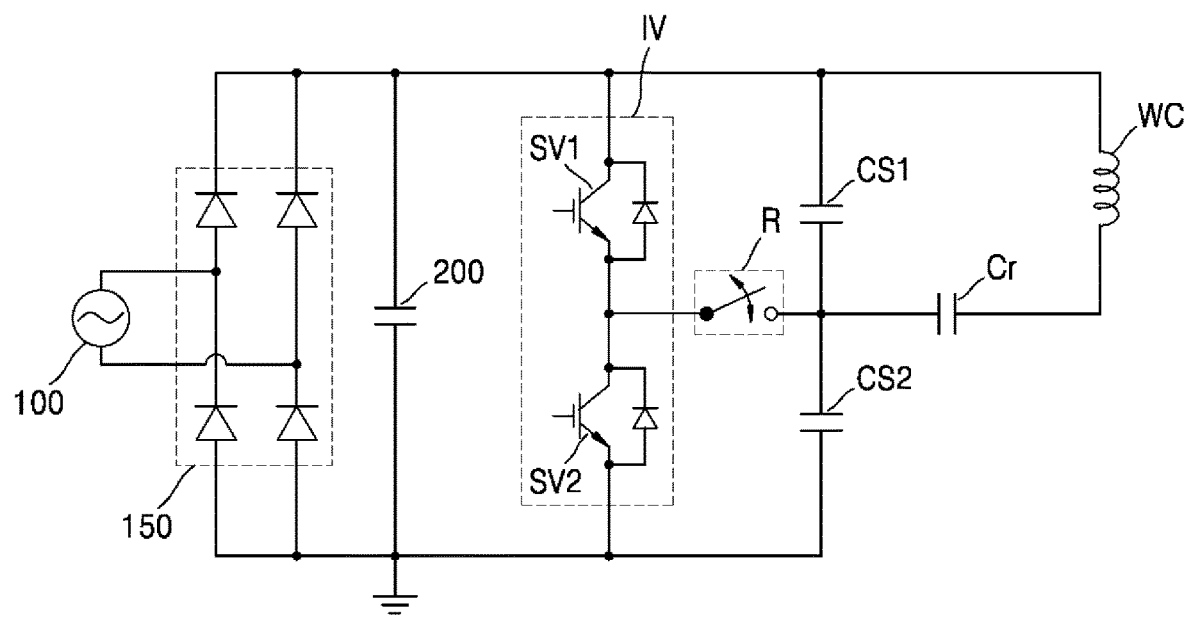
FIG. 9 is a circuit diagram illustrating an example of an induction heating apparatus.

FIG. 9 is a circuit diagram illustrating an example of an induction heating apparatus.

The induction heating apparatus 2 is the same as the induction heating apparatus 1 in FIG. 4, except some components and structures. Accordingly, differences are described hereunder.

Referring to FIG. 9, the induction heating apparatus 2 may include a power supply 100, a rectifier 150, a DC link capacitor 200, an inverter (IV), a plurality of snubber capacitors (CS1 and CS2), a resonance capacitor (Cr), a working coil (WC), and a relay (R).

One end and the other end of the working coil (WC) of the induction heating apparatus 2 in FIG. 9 may be electrically connected respectively to the resonance capacitor (Cr) and one end of the DC link capacitor 200 (i.e., a portion to which a DC voltage is supplied), unlike those of the induction heating apparatus 1 in FIG. 4.

In some examples, the first end of the DC link capacitor 200 may be electrically connected to a first end of the first switching element SV1, a first end of the first snubber capacitor CS1, and a first end of the working coil WC. The relay R may have (i) a first end that is electrically connected to a second end of the first switching element SV1 and a first end of the second switching element SV2, and (ii) a second end that is electrically connected to a second end of the first snubber capacitor CS1, a first end of the second snubber capacitor CS2, and the resonance capacitor Cr. The second end of the DC link capacitor 200 may be electrically connected to a second end of the second switching element SV2, a second end of the second snubber capacitor CS2, and a ground node.

In some implementations, the induction heating apparatus 2 may be the same as or similar to the induction heating apparatus 1 in FIG. 4 when it comes to their operation processes or performance, effects and the like, except their electrical connection relations with the working coil (WC) and their positions.

As illustrated in FIG. 8, when a semiconductor switch (SS) is electrically connected additionally to the working coil (WC) to turn on/turn off the working coil (WC) at high speed and a plurality of the working coils (WC) and a plurality of the semiconductor switches (SS) are provided, the induction heating apparatus 2 may also be implemented as a zone free-type induction heating apparatus.

The present disclosure, described above, may be replaced, modified and changed in various different forms without departing from the technical spirit of the disclosure by one having ordinary skill in the art to which the disclosure pertains. Thus, the present disclosure should not be construed as being limited to the embodiments and drawings set forth herein.

The invention claimed is:

1. An induction heating apparatus, comprising:
a working coil;
an inverter configured to perform a switching operation to thereby supply a resonance current to the working coil;
a plurality of snubber capacitors that are configured to be electrically connected to the inverter;
a relay that is configured to electrically connect the inverter to the plurality of snubber capacitors and to electrically disconnect the inverter from the plurality of snubber capacitors; and
a controller configured to:
provide a control signal having a fixed frequency to the inverter to thereby control the switching operation, in a state in which the relay electrically connects the inverter to the plurality of snubber capacitors, change periodically a pulse width of the control signal based on a temperature of the inverter, and
based on a phase of current in the working coil leading a phase of a voltage supplied to the inverter, control the relay to electrically disconnect the inverter from the plurality of snubber capacitors.

2. The induction heating apparatus of claim 1, wherein:
the inverter comprises a first switching element configured to perform a first switching operation and a second switching element configured to perform a second switching operation; and
the plurality of snubber capacitors comprise a first snubber capacitor corresponding to the first switching element, and a second snubber capacitor corresponding to the second switching element.

3. The induction heating apparatus of claim 2, wherein the controller is configured to:
based on the phase of the current in the working coil leading the phase of the voltage supplied to one of the first switching element or the second switching element, control the relay to electrically disconnect the inverter from the plurality of snubber capacitors.

4. The induction heating apparatus of claim 1, wherein:
the inverter comprises a first switching element that is configured to perform a first switching operation based on the control signal and a second switching element that is configured to perform a second switching operation based on the control signal;
the controller is configured to:
provide the first switching element with a first control signal having a first pulse width, and
provide the second switching element with a second control signal having a second pulse width; and
the first pulse width and the second pulse width are complementary to each other.

5. The induction heating apparatus of claim 4, wherein the controller is configured to:
determine the first pulse width based on a first temperature of the first switching element and a second temperature of the second switching element; and
change periodically the pulse width of the control signal to match the first pulse width and
provide the control signal to the first switching element.

6. The induction heating apparatus of claim 4, wherein the second switching element is configured to:
based on the first switching element being turned on by the first control signal, be turned off by the second control signal; and
based on the first switching element being turned off by the first control signal, be turned on by the second control signal.

7. The induction heating apparatus of claim 1, further comprising:
a resonance capacitor electrically connected to the working coil;
a rectifier configured to convert alternating current (AC) power received from a power supply into direct current (DC) power and to supply the DC power to the inverter; and
a DC link capacitor that is electrically connected to the rectifier and the inverter and that is configured to reduce variation of the DC power converted by the rectifier.

8. The induction heating apparatus of claim 7, wherein:
the inverter comprises a first switching element configured to perform a first switching operation and a second switching element configured to perform a second switching operation;
the plurality of snubber capacitors comprise a first snubber capacitor corresponding to the first switching element, and a second snubber capacitor corresponding to the second switching element; and
the DC link capacitor has a first end configured to receive a voltage of the DC power and a second end electrically connected to a ground.

9. The induction heating apparatus of claim 8, wherein:
the first end of the DC link capacitor is electrically connected to a first end of the first switching element and a first end of the first snubber capacitor;
the relay has (i) a first end that is electrically connected to a second end of the first switching element and a first end of the second switching element, and (ii) a second end that is electrically connected to a second end of the first snubber capacitor, a first end of the second snubber capacitor, and the resonance capacitor; and
the second end of the DC link capacitor is electrically connected to a second end of the second switching element, a second end of the second snubber capacitor, and the working coil.

10. The induction heating apparatus of claim 7, wherein:
the resonance capacitor is electrically connected in series with the working coil; and
the DC link capacitor is electrically connected in parallel to the rectifier and to the inverter.

11. The induction heating apparatus of claim 1, further comprising:
a semiconductor switch that is electrically connected to the working coil and that is configured to turn on the working coil and turn off the working coil,
wherein the controller is configured to control operation of the semiconductor switch.

12. The induction heating apparatus of claim 1, wherein the inverter is a half bridge type inverter.

13. The induction heating apparatus of claim 4, wherein the controller is configured to:
turn on the first switching element based on turning off the second switching element, the first pulse width corresponding to a period for which the second switching element is turned off; and
turn on the second switching element based on turning off the first switching element, the second pulse width corresponding to a period for which the first switching element is turned off.

14. The induction heating apparatus of claim 13, wherein the second pulse width is equal to a first off-duration of the first control signal between two pulses of the first control signal, and
wherein the first pulse width is equal to a second off-duration of the second control signal between two pulses of the second control signal.

15. The induction heating apparatus of claim 8, wherein:
the first end of the DC link capacitor is electrically connected to a first end of the first switching element, a first end of the first snubber capacitor, and a first end of the working coil;
the relay has (i) a first end that is electrically connected to a second end of the first switching element and a first end of the second switching element, and (ii) a second end that is electrically connected to a second end of the first snubber capacitor, a first end of the second snubber capacitor, and the resonance capacitor; and
the second end of the DC link capacitor is electrically connected to a second end of the second switching element and a second end of the second snubber capacitor.

16. The induction heating apparatus of claim 9, further comprising:
a semiconductor switch that is electrically connected to the working coil and that is configured to turn on the working coil and turn off the working coil,
wherein the semiconductor switch has a first end that is connected to the working coil and a second end that is connected to the second end of the second snubber capacitor and the second end of the second switching element.

17. The induction heating apparatus of claim 1, wherein the controller is configured to change periodically the pulse width of the control signal based on a predetermined cycle, the predetermined cycle comprising:
a first on-duration for which the inverter is turned on;
a first off-duration for which the inverter is turned off after the first on-duration, the first off-duration being greater than or equal to the first on-duration;
a second on-duration for which the inverter is turned on after the first off-duration, the second on-duration being greater than or equal to the first on-duration; and
a second off-duration for which the inverter is turned off after the second on-duration, the second off-duration being different from the first off-duration.

18. The induction heating apparatus of claim 17, wherein the second on-duration is equal to the first off-duration.

19. The induction heating apparatus of claim 17, wherein a time point for switching from the first off-duration to the second on-duration is predetermined based on an increase of the temperature of the inverter during the switching operation.

* * * * *